United States Patent [19]

Horn

[11] 4,000,324
[45] Dec. 28, 1976

[54] ARTICLE OF FOOD AND METHOD OF MAKING THE SAME

[75] Inventor: Herbert Horn, Mattoon, Ill.

[73] Assignee: Horn's Poultry, Inc., Mattoon, Ill.

[22] Filed: Aug. 25, 1975

[21] Appl. No.: 607,368

Related U.S. Application Data

[63] Continuation of Ser. No. 453,594, March 22, 1974, abandoned.

[52] U.S. Cl. .............................. 426/103; 426/549; 426/582; 426/575; 426/573
[51] Int. Cl.² .................... A23C 19/00; A21D 8/02
[58] Field of Search ............ 426/89, 104, 103, 138, 426/273, 583, 274, 275, 285, 289, 292, 293, 296, 302, 303, 304, 305, 549, 573, 575, 438, 439, 497, 502, 523, 582

[56] References Cited

UNITED STATES PATENTS

| | | | |
|---|---|---|---|
| 2,771,370 | 11/1956 | Allen | 99/193 |
| 3,143,424 | 8/1964 | Wilson | 99/1 |
| 3,669,674 | 6/1972 | Klug | 99/1 |
| 3,676,158 | 7/1972 | Fischer | 99/166 |
| 3,690,898 | 9/1972 | Partyka | 99/86 |
| 3,767,823 | 10/1973 | Wheeler | 426/296 |
| 3,843,827 | 10/1974 | Lee | 426/296 |
| 3,843,827 | 10/1974 | Lee | 426/302 |

*Primary Examiner*—Hiram H. Bernstein
*Attorney, Agent, or Firm*—Wegner, Stellman, McCord, Wiles & Wood

[57] ABSTRACT

The present invention provides an edible product and the method of making the same wherein a food product, such as cheese or the like, is positioned on a slice of bread-like material and the combination is encapsulated within a batter-breading coating, with the arrangement being such that the product can be fried in hot fat with the coating isolating the combination from the frying oil, preventing the cheese or other food product from spreading into the frying oil, and maintaining the bread-like material in dry form.

1 Claim, No Drawings

ARTICLE OF FOOD AND METHOD OF MAKING THE SAME

CROSS-REFERENCE

This application is a continuation of my copending application Ser. No. 453,594 filed Mar. 22, 1974, now abandoned.

BACKGROUND OF THE INVENTION

Prepared food products, particularly those designed to be frozen either before or after cooking and then prepared for eating by subsequently thawing and heating, are available in a variety of forms. Food products which are prepared by frying in deep fat, such as potato chips, have been available for a number of years. Lacking from the prepared foods market are combinations of bread and a food product, like an open-face sandwich, particularly those containing a food product which melts at high temperatures such as, for example, grilled cheese sandwiches, or open-face cheese sandwiches. One of the reasons such a combination, such as open-face cheese sandwiches which are to be cooked by frying in deep fat, cannot be properly prepared, is simply that upon such frying the cheese melts and disperses into the fat. Even with a material that does not melt, the bread constituting part of the combination becomes saturated with fat and presents a soggy unappetizing article.

BRIEF SUMMARY OF THE INVENTION

In accordance with the present invention, food items comprising a combination of bread and a food product, such as cheese sandwiches, can be prepared for frying in deep fat by first forming the combination and then encapsulating it within a coating of batter-breading material. Upon immersing the article in fat having a temperature of the order of 350°, the coating encapsulates the combination forming a cocoon-like enclosure, allowing the contents of the combination, bread and cheese or the like, to become thoroughly heated, while at the same time sealing the combination from the fat in which it is fried and sealing within the batter the filling with which it is prepared.

The food article of the present invention may be breaded and battered and then frozen, to be subsequently cooked by frying in deep fat or, alternatively, may be cooked immediately in deep fat and then frozen to be reconstituted later simply by heating.

DETAILED DESCRIPTION OF THE PREFERRED EMBODIMENT

While the food article of the present invention may be in the form of an open-face sandwich with various forms of bread-like material serving as the lower portion, it is preferred to use a bun-type product such as an English muffin or a hamburger bun. For the purpose of describing the preferred embodiment of the present invention the use of cheese as the filler will be used. In forming the product, the following steps are utilized:

The cheese is placed on a slice of English muffin;
a batter is applied to the exterior surfaces;
a breading is then applied over the batter;
the product is then re-battered; and finally re-breaded.

The end product can then be fried in deep fat at a temperature of 350°, and then eaten immediately, or frozen for future use, or the product may be frozen prior to heating and reconstituted by frying it in deep fat at a temperature of about 350° for approximately 2½ minutes.

The preferred ingredients for the breading are as follows:

| | |
|---|---|
| Wheat flour | 90% |
| Salt | 5% |
| Dried whey | 3% |
| Leavening | 1% |
| Dextrose | 0.5% |
| Paprika (for coloring) | 0.1% |
| Vegetable oil | 0.4% |

The preferred ingredients for the batter are as follows:

| | |
|---|---|
| Cellulose gum | 10% |
| Carageenan | 8% |
| Monodiglycerides in an aqueous solution containing glycerin | 0.5% |
| Propylene glycol | 0.5% |
| Water | 80% |

The resulting product, following the process described above, provides a new and very tasty article of food. The encapsulating batter-breading layers are of course completely edible, the bread-like parts of the combination, i.e., the English muffin or hamburger bun, are not wetted by the fat of the frying operation and remain completely dry, except for whatever cheese may melt into them, and the cheese itself is entirely retained within the cocoon thus formed and does not disperse into the fat.

I claim:

1. An article of food comprising a combination including a lower bread-like section, a cheese product positioned on the section, a layer of batter over the combination, a layer of breading over said layer of batter, a second layer of batter over the layer of breading, and a second layer of breading over the second layer of batter whereby said layers encapsulate the combination, said batter including 80% water, 10% cellulose gum, 8% carageenan, and less than 1% each of monodiglycerides and propylene glycol, and said breading including 90% wheat flour, 5% salt, 3% dried whey, and 1% leavening, said layers being heat-formed into a cocoon-like seal enclosing the combination.

* * * * *